UNITED STATES PATENT OFFICE.

LOUIS BOULÉ, OF BOURGES, DEPARTMENT OF CHER, FRANCE.

PROCESS OF TREATING HOPS TO OBTAIN EXTRACTS THEREFROM.

SPECIFICATION forming part of Letters Patent No. 338,027, dated March 16, 1886.

Application filed July 13, 1885. Serial No. 171,415. (No specimens.) Patented in France May 19, 1883, No. 155,560; in Belgium August 25, 1883, No. 62,404; in England August 28, 1883, No. 4,151, and in Germany August 30, 1883, No. 26,434.

*To all whom it may concern:*

Be it known that I, LOUIS BOULÉ, a citizen of the Republic of France, and residing in Bourges, (Cher,) France, have invented a Process of Treating Hops for the Purpose of Obtaining an Extract Therefrom, of which the following is a specification.

It has heretofore been difficult to preserve the aroma and valuable properties of hops for a considerable length of time. They in the course of time—say, after about a year—acquire a cheesy odor, due to the oxidation of the volatile oil, which gradually becomes converted in valerianic acid. This arises from the lupuline (farina or nutarium) being distributed in the form of a powder over a large surface exposed to the air, which produces a powerful oxidizing action. Many attempts have been made to prevent this rapid and deep oxidation. Sulphuration, compression, and inclosing *in vacuo* have been tried but without success. The volatile and extractive parts of the plant have sometimes been separated by lixiviation or distillation, but extracts thus obtained deteriorate, and it is found that the aroma of the hop is destroyed by distillation. Extracting the essential oil of hops by means of ether or sulphide of carbon has also been tried, but such processes have failed to yield any practical result.

The present invention relates to a process by means of which an extract of hops is obtained, which complies with all the requirements of the brewer, and is not subject to the rapid deterioration and other disadvantages resulting from the processes heretofore employed.

The said invention consists in mixing or combining with the lupuline or lupulite inert matter obtained by utilizing the bracts or leaflets of the hop, as hereinafter described. The volume of the cones of the hop-plant forms an obstacle to the preservation of the valuable aromatic principles, which become rapidly oxidized and destroyed by exposure to the atmosphere. The lupuline or lupulite occupies a small space relatively to the cones, but when accumulated in a mass by itself it is liable to become heated, and in a short time loses its valuable properties.

According to the present invention the lupuline is preserved by mixing it with inert matter consisting of a pulverulent extract of the bracts or leaflets, from which the lupuline has been removed.

The improved process comprises two operations, namely: first, the mechanical separation of the lupuline or lupulite; and, secondly, the extraction *in vacuo* of the fixed extractive matter contained in the bracts or leaflets.

In order to treat hops according to this invention the plant is preferably taken soon after picking and dried rapidly to brittleness at a temperature of about 20° centigrade in dry air. When the hops are thus dried, the usual practice is to allow them to absorb a little moisture in order that they may not be liable to break and waste the lupuline in the subsequent manipulation connected with the pocketing. The hops as prepared for treatment according to this invention are, however, thoroughly dried in the first instance, and the cones are then sifted on sieves, through which small fragments of the leaflets are allowed to pass along with the lupuline. The lupuline thus obtained is placed on one side, and the fragments of leaflets act as insulators, assisting in its preservation until it is mixed with the dry extract prepared as hereinafter described. The leaflets from which the lupuline has been separated are treated by lixiviation at a temperature of about 100° centigrade until they cease to color the water and no longer impart to it a bitter flavor. The liquor thus charged with the extract from the leaflets is then evaporated in a vacuum at a temperature of about from 30° to 40° centigrade, so as to produce the extract in a dry state. This extract, reduced to a fine powder, is mixed by means of a wood or bone spatula with the lupuline, which has been separated by sifting from the greater part of the fragments of the leaflets, as hereinbefore described. The yield will vary with the strength of the hops. As an example, supposing that we take five hundred kilograms of hops of a moderate strength, this will give us fifty kilograms of lupuline, say about ten per cent., and seventy-five kilograms of dry extract, say about fifteen per cent. The total of normal hops will thus be one hundred and twenty-five kilograms. The product or extract thus obtained, and termed "normal hops," is inclosed in air-tight receptacles, and is capable of retaining its valuable properties for a considerable period, while its portability and condition greatly facilitate its employment in the brewery. The strength and qualities of this extract or normal hops being accurately ascertained or gaged beforehand, it suffices to introduce a quantity of the said extract corresponding or equivalent to a given measure of ordinary hops into the wort, preferably about five minutes before running off the latter. Thus the wort is supplied at once with all the extractive matter and all the resinous tannic and aromatic principles of hops, the cellulose or superfluous part of the cones being alone omitted. The extractive matter dissolves rapidly, and the lupuline remains in contact with the liquid during the whole time of the fermentation, which is an advantage, as the product thus obtained is more aromatic and may be preserved in better condition than would otherwise be the case. The fermentations act more efficiently, being at once a slow and a powerful force, which promotes the solution and especially the combination of the principles of the hops, whereas a prolonged boiling seriously injures the fixed principles and destroys the volatile principles by evaporation.

The chief advantages resulting from the employment of the extract obtained as hereinbefore described are facility and economy in transport, effectual preservation of the aromatic and other properties, and facility for manipulation in the brewery, whereby the process of brewing is enabled to be conducted with great certainty and precision.

I claim—

1. The process herein described of producing a hop extract, said process consisting in mixing with the lupuline of the hop-plant the dry extract of the leaflets of the plant, substantially as set forth.

2. The process herein described of treating hops to obtain an extract therefrom, said process consisting in first separating the lupuline from the plant and obtaining a liquid extract from the leaflets of the plant, drying this extract, and finally mixing it with lupuline, all substantially as set forth.

3. The process herein described of treating hops to obtain an extract therefrom, said process consisting in first separating the lupuline and lixiviating the leaflets from which this lupuline has been separated, evaporating the extracted liquor in a vacuum, drying the extract, and finally mixing it with the lupuline, all substantially as set forth.

In testimony whereof I have signed my name to this specification in the presence of two subscribing witnesses.

LOUIS BOULÉ.

Witnesses:
JOSEPH DELAGE,
ROBT. M. HOOPER.